United States Patent [19]

Halvorson, Sr.

[11] 3,836,713
[45] Sept. 17, 1974

[54] UNITIZED ELECTRIC HEATER ASSEMBLY FOR A COFFEE PERCOLATOR

[76] Inventor: Kenneth M. Halvorson, Sr., 2909 Ruby Ave., Racine, Wis. 53402

[22] Filed: Sept. 4, 1973

[21] Appl. No.: 394,305

[52] U.S. Cl.................. 219/441, 99/281, 219/436, 219/439, 219/530
[51] Int. Cl............................................. F27d 11/02
[58] Field of Search ........... 219/433, 436, 438, 439, 219/441, 442, 550; 99/281, 285, 310

[56] References Cited
UNITED STATES PATENTS

| | | | |
|---|---|---|---|
| 2,904,667 | 9/1959 | Deist................................... | 219/441 |
| 3,231,717 | 1/1966 | Moorhead........................... | 219/441 |
| 3,265,863 | 8/1966 | Bender............................. | 219/441 X |
| 3,369,105 | 2/1968 | Wheeler.............................. | 219/441 |
| 3,392,662 | 7/1968 | Schwartz, Jr. ........................ | 99/285 |
| 3,725,642 | 4/1973 | Weidner.............................. | 219/441 |

Primary Examiner—Volodymyr Y. Mayewsky
Attorney, Agent, or Firm—Arthur J. Hansmann

[57] ABSTRACT

A unitized electric heater assembly for a coffee percolator and having a body member which contains and supports a heater wire and a warming coil. An electric connector block is fixedly mounted on the body by means of a bar which spaces the block from the body, and the block has electric connection pins embedded therein and extending therefrom for releasable connection with the usual electric plug. The pins and the wires are electrically connected, and a thermostat is included in the circuit. The body member has recesses and ears for snugly securing the warming coil on a surface on the body member, and the surface has a shoulder thereon, all so that the warming coil can be securely held in a fixed position on the body member and the entire structure is unitized so that it can be assembled with a coffee percolator without further positioning or manipulation of the warming coil or any other part.

9 Claims, 9 Drawing Figures

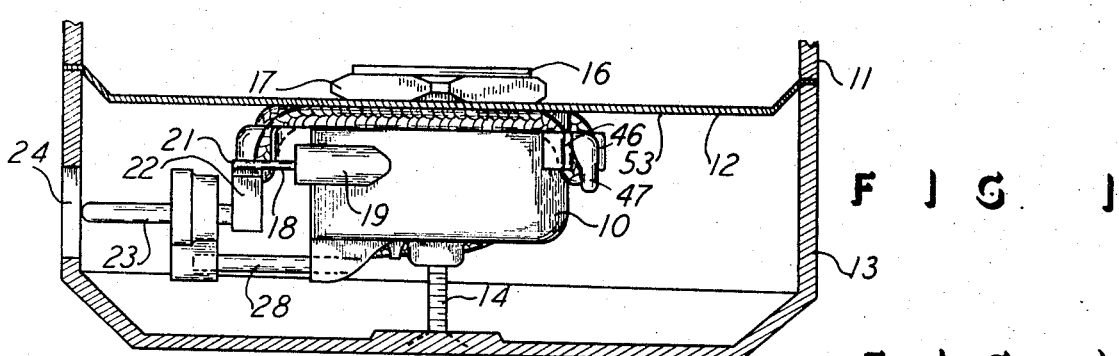
FIG. 1
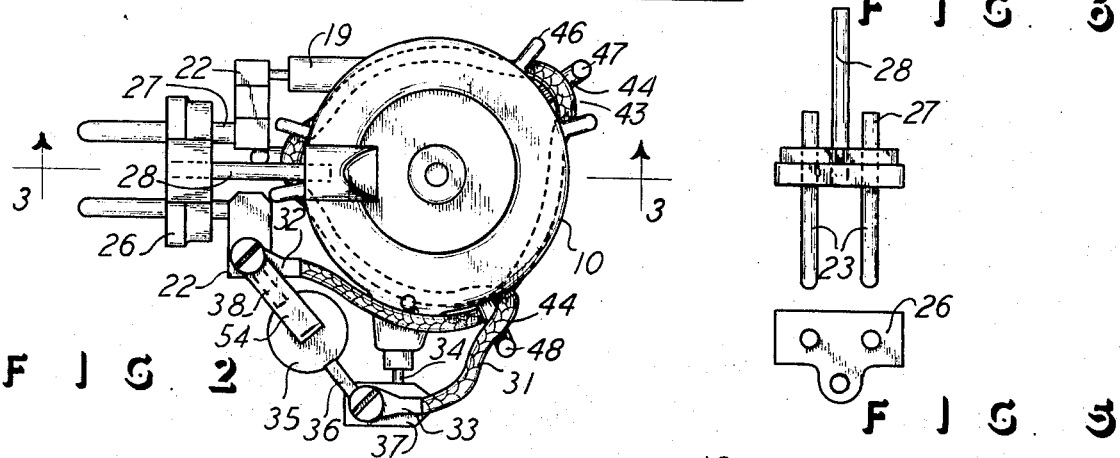
FIG. 2
FIG. 6
FIG. 5
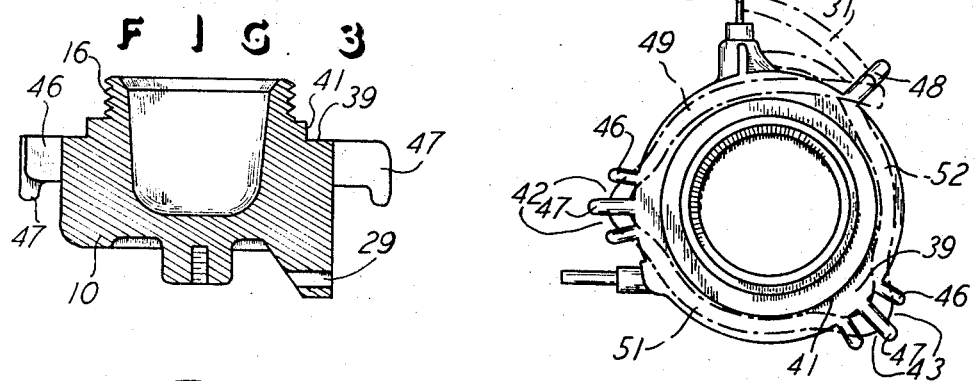
FIG. 3
FIG. 4
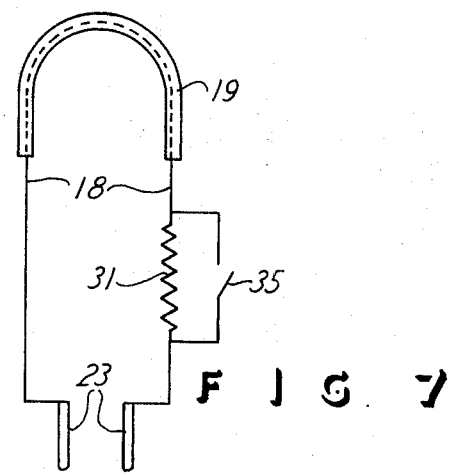
FIG. 7
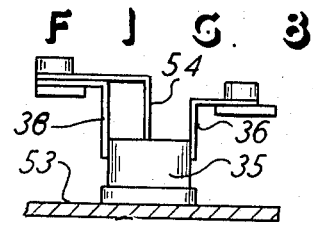
FIG. 8

UNITIZED ELECTRIC HEATER ASSEMBLY FOR A COFFEE PERCOLATOR

This invention relates to a unitized electric heater assembly for a coffee percolator, and, more particularly, it pertains to the electric heater members which include the heater wire and the warming coil, both of which are supported by a body member mounted in the base of the coffee percolator.

BACKGROUND OF THE INVENTION

The manufacture and assembly of coffee percolators is commonly carried out by making a sub-assembly of only some of the percolator heating parts and subsequently assembling those parts with other heating parts and the percolator or coffee pot itself. The sub-assembled heater parts are commonly made by one manufacturer, and another manufacturer then purchases the sub-assembled heater parts and assembles them with the other heating parts and the coffee pot. That is, it is common practice to make some of the heater parts in one location or by one manufacturer, and these parts are then transported to another location where they are assembled with the other heater parts and the coffee pot itself. The heater parts are commonly made by a die casting process where the body of the heater sub-assembly is cast with the heater wire therein; then at another time and place and by the percolator manufacturer, a warming coil, thermostat, and the connector pins for the plug are added to the sub-assembly to complete the manufacture of the percolator.

One of the solutions to the aforesaid problems of manufacture and assembly is to provide the heater sub-assembly in a form which is complete at the aforesaid first stage so that there is a heater sub-assembly which is complete and unitized and compact. Also, in the making of the final assembly, the heater parts are in their proper position and do not require special skills or manipulation for making the final assembly with the coffee pot. The present invention accomplishes the aforementioned objectives, and the present invention particularly provides a heater sub-assembly of a unitized nature wherein all of the parts are in a fixed or set form and can be easily handled and especially they can be easily assembled with the coffee pot. Particularly, the problem of incorporating the electric connection pins in the assembly and the problem of positioning and retaining the warming coil in position are two problems which this invention solves.

Accordingly, the present invention provides a structure wherein the electric connection pins for the electric plug can be firmly and readily and easily provided in the sub-assembly, and the pins can be properly supported in a fixed position relative to the remainder of the sub-assembly. Still further, the present invention provides a means for securely positioning and retaining the warming coil on the sub-assembly so that it is properly positioned relative to the coffee pot, and the warming coil, thermostat, and plug pins need not be added by the coffee pot manufacturer.

In accomplishing the aforementioned objectives and overcoming the problems referred to, reference is made to U.S. Pat. No. 3,265,863 wherein the electric connector pins are formed in an assembly which requires numerous parts and special manufacturing attention and process, and also the warming coil is not added or supplied by the manufacturer of the sub-assembly heater parts and it is not retained in a unitized fashion with the entire sub-assembly and is actually free to move relative to the body of the assembly and therefore presents a problem in the manufacture of the final completed assembly. Additionally, the disclosure of U.S. Pat. No. 3,265,863 shows that in providing the plug connecting pins, the pins require special attention for securing them in the sub-assembly, and this is the same short-coming and concern in other disclosures such as that shown in U.S. Pat. No. 2,213,723 where threading is required and nuts are then employed for holding the connecting pins.

It is therefore a general object of this invention to provide a unitized electric heater assembly which is complete, compact, and sturdy and which includes the warming coil, and the connecting pins are provided with a minimum of attention and parts to therefore facilitate the efficiency of the unit and the ease of making the final assembly.

Other objects and advantages will become apparent upon reading the following description in light of the accompanying drawings.

BRIEF DESCRIPTION OF THE DRAWINGS

FIG. 1 is a sectional view through the base of a coffee percolator and showing a preferred embodiment of the unitized assembly of this invention.

FIG. 2 is a bottom plan view of the unitized sub-assembly shown in FIG. 1.

FIG. 3 is a sectional view of the body member taken along the line 3—3 of FIG. 2.

FIG. 4 is a top plan view of the body member shown in FIG. 2.

FIG. 5 is an end elevational view of the pin connection block shown in FIGS. 1 and 2.

FIG. 6 is a top plan view of the assembly shown in FIG. 5.

FIG. 7 is a wiring diagram of the circuit used in the unitized sub-assembly disclosed herein.

FIG. 8 is a side view of the thermostat.

DETAILED DESCRIPTION OF THE PREFERRED EMBODIMENT

Figure 9:
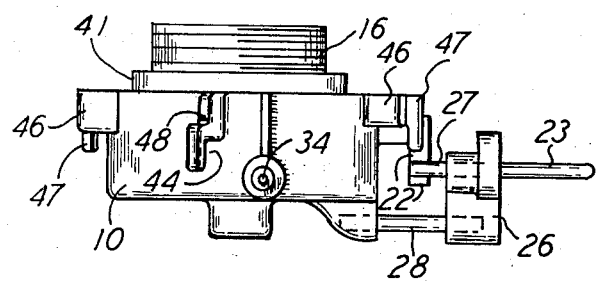
FIG. 9 is a side elevational view of a portion of the assembly shown in FIG. 1, and showing the side opposite to that shown in FIG. 1.

A body member 10 is preferably die-cast and is suitably supported within the coffee pot or percolator 11 having the bottom wall 12 extending fluid tightly across the coffee pot and having the base portion 13, all in a conventional arrangement. A screw 14 can be used for securing the bottom 13 and the body 10 together as shown. Also, the body 10 has an upwardly disposed threaded portion 16, as shown in FIG. 1, which receives a nut 17 for attaching the sub-assembly including the body 10 to the percolator base or bottom 12. An electric heating wire 18 is imbedded within the body 10, and it is preferably cast therein and surrounded by insulation material 19, in a conventional arrangement. The wire 18 has its two ends 21 extending from the body 10, and these ends are electrically connected with flat pieces 22 which in turn connect to the pins 23, and the connections mentioned can be by soldering or the like. It will also be understood that the pins 23 align with an opening 24 in the coffee pot base piece 13, and the pins 23 provide the electric connections for the electric plug or power source, all in the conventional manner.

The pins 23 are embedded in a block 26 which is of a non-electric conductive material, and the block 26 and the pins 23 can be cast together, and the pins 23 have their inner ends 27 extending toward the body 10, and it is these ends 27 that make electric contact with the flat or spade pieces 22, as mentioned. A bar 28 is connected between the block 26 and the body 10 to support the block 26 and its pins 23 in spaced position relative to the body 10. The bar 28 is therefore a mounting member, and it may be molded or cast integrally with the block 26 to extend therefrom and project into an opening 29 in the body 10. The projecting end of the bar 28 can then be fluted to be press fit and welded into the opening 29, or it can be threaded, cemented, bolted, or even cast directly into the opening at 29 so that the block 26 and its pins 23 are in fixed position relative to the body 10, as shown.

Another electric wire 31 has its one end 32 connected with one of the spade pieces 22, and it has its other end 33 connected with an end 34 of the first electric wire 18, as seen in FIG. 2. Thus the wire 31 is a pliable type of wire, and it is in the nature of a fabric-coated wire used as a warming coil, in a manner mentioned later. Thus the wire 31 is flexibly wrapped around the body 10, as shown. Finally, a thermostat 35 has a connection 36 extending to a spade 37 which is connected to the wire ends 33 and 34, and the thermostat has another electric connecting end 38 extending to one of the spades 22 to be connected with it and the warming coil wire 31.

Thus, the basic parts mentioned, namely, the body 10, the block 26 and its pins 23, and the two wires 18 and 31, and the thermostat 35, all form a unitized sub-assembly which can be handled in one compact package and assembled with the coffee pot or percolator, as shown in FIG. 1.

The drawings further show that the body 10 has a shouldered surface 39, which is shown to be a circular surface extending around the body 10. An upright wall 41 also extends around the body 10 and adjacent the surface 39, and it will be understood that the warming coil 31 is disposed on the surface 39 and nested between the surface 39 and the wall 41, as shown in FIGS. 1 and 2 and as shown by the dotted lines in FIG. 4. Also, the body 10 has a plurality of recesses 42, 43, and 44, all spaced around the surface 39 and around the body 10, and the warming coil 31 is wrapped around the body 10 and through the recesses mentioned, so that the warming coil 31 is secure and snug with the body 10 and will not move away from the body 10, and thus the unitized sub-assembly is achieved. The recesses 42 and 43 are shown between ears 46 and 47, and recess 44 is shown in FIG. 2 to be defined by one ear, namely ear 47 in FIG. 2, and therefore recess 44 is likewise on ear 48 in FIGS. 2 and 4, since ear 48 is shown hook-shaped like ear 47.

The recesses mentioned are formed by the body 10 and by a plurality of ears 46 and 47 and 48 and the like, as shown extending radially outwardly from the body 10. These ears are cast with the body 10 and are therefore affixed thereto. FIGS. 1 through 4 and FIG. 9 show the ears 46, 47, and 48, and the recess 44 defined by the hook-shaped ear 48. FIG. 4 shows the coil 31 extending in dot-dash lines, and it has three substantially straight sections 49, 51, and 52 extending between the ears 46, 47, and 48, and the coil 31 is also shown to be wrapped around the ears and disposed snugly on the shouldered surface 39 to be completely positioned and tight with the body portion 10. Also, it will be seen and understood that the coil 31 is of a length substantially longer than the circumference of the shouldered surface 39, and thus the coil 31 is adequately intertwined with the body 10 for performing the function of a warming coil in maintaining and creating heat in the body portion 10 which is of a thermally conductive metal. That is, the warming coil 31 is substantially twice the length of the circumference of the surface 39, but the warming coil 31 is snug with the body 10 and therefore completes the unitized sub-assembly desired.

The wire 31 is therefore tautly trained on the shouldered surface 39, and it will be understood that if the wire 31 had a more arcuate shape in its extent along the surface 39, then the wire could slide above the surface 39 and become loose and thereby create a problem in the operation of assembling the sub-assembly with the coffee pot itself. The wire 31 is therefore free of any slack as it extends in the substantially three straight portions along the surface 39, and the wire is also of a thickness the same as the height of the shoulder 41 for the purpose of positioning the wire in snug contact with the bottom surface 53 of the percolator bottom wall 12 for efficient warming functions. Therefore, the recesses 42, 43, 44, and the like are substantially in straight-line relationship with every two adjacent ones thereof. Also, the two sets of ears 46, 47, and the ear 48, are shown to be equally spaced around the body 10 for further permitting the wire 31 to be in substantially straight extents in its three lengths on the surface 39.

With the sub-assembly as described, the sub-assembly can then be taken as a compact unit and assembled with the coffee pot, and the wire 31 is already incorporated into the sub-assembly so it need not be added later and then maneuvered into the final assembly, and the wire 31 will be in its correct position when it is assembled with the coffee pot and is positioned against the base wall 12, as described.

Also, the pins 23 can be formed with the block 26 by molding the block 26 and the pins 23 in one molding function, and the block 26 in pins 23 can also be integrally formed with the bar or pin 28, and that sub-assembly can then be physically connected with the body 10, through the connection at the body opening 29, and that electric sub-assembly can also be electrically connected with the wires of the body 10, as described and shown. That is, no special staking or nuts or any other process or parts are required for the molded assembly of the block 26 in the pins 23, and the ultimate connection thereof with the body 10 can be as previously described herein, and a secure and properly located positioning for the pins 23 is achieved.

FIG. 7 shows the wiring diagram, and here it will be seen that the pins 23 are shown connected with the wire 18, and the warming coil 31 and the thermostat 35 are also shown in the circuit. It will therefore be understood that when the thermostat 35 is in the cool condition, the thermostat is electrically closed and the electric current will then go through the thermostat 35 and the heater coil 18, for the percolating of the coffee. When the coffee reaches its desired temperature, then the thermostat 35 will open and the electric current is then directed through the heating coil 31, and therefore the current is of a value such that the coffee will simply be held at its temperature and will not be heated for percolating, all in the conventional wiring arrangement. It will also be understood that the thermostat will be disposed against the base 53, for the desired sensitivity of the thermostat, and the thermostat electric connections 36 and 38 are available for retaining the thermostat 35 in that position, as shown in FIG. 8, and a spring support 54 may also be mounted as shown, but is not necessary.

It will be understood that the wire 31 is of a sufficient length to provide its function of the warming coil and the necessary resistance for the circuit when the thermostat is in the open position. Therefore, the wire 31 is a resistance wire covered with a fiberglass type of exterior or insulation sheath, of a conventional construction so that the wire 31 is completely pliable or flexible, much like a piece of rope, and in fact it is sometimes called a warming rope. It will therefore be understood that the warming coil or rope 31 is held in fixed position relative to the body 10 without reliance upon any other part of the coffee pot, such as the base 12, though the rope 31 is disposed in extended contact with the base 12, as in the three rope sections 49, 51, and 52. Also, the sub-assembly including the coil 31, thermostat 35, and pins 23 can now be supplied and incorporated by the maker of the body piece 10, and the percolator manufacturer need not add these parts, and he need not maneuver the coil 31 in the final assembly.

What is claimed is:

1. A unitized electric heater assembly for assembly with the coffee-retaining bottom wall of a coffee percolator, comprising a body of a thermally conductive material, an electric heater element embedded in and electrically insulated from said body and having two ends extending therefrom, two electric connector pins respectively and separately electrically connected with said element two ends for releasable connection with an electric source, an electric wire electrically connected with said pins for conducting electric current through said wire and being in contact with said body and electrically insulated therefrom for warming the coffee, a thermostat electrically connected with said element and said pins and said wire for conducting electricity through said wire when said thermostat is in its electrically open position, said body having a shouldered surface and having recesses spaced apart adjacent said shouldered surface and with said shouldered surface extending at least substantially completely around said body for disposing said shouldered surface spaced below and faced toward the coffee-retaining bottom wall of the percolator, said electric wire being tautly trained along and on said shouldered surface and threaded through said recesses and being attached to said body free of any slack in said wire for being immovably attached to said body to form a unitized assembly therewith, said body having a wall adjacent said shouldered surface and extending therefrom into abutment with the percolator bottom wall, and said electric wire being adjacent said wall and said wall being of a height the same as the thickness of said electric wire on said shouldered surface for snug positioning of said electric wire against the percolator bottom wall.

2. The unitized assembly as claimed in claim 1 wherein said recesses are spaced apart relative to said shouldered surface in substantially straight-line spacing between every two adjacent ones of said recesses for at least substantially straight-line training of said electric wire between the said two adjacent recesses and thereby retaining said electric wire securely on said shouldered surface.

3. The unitized assembly as claimed in claim 1, including ears on said body and extending therefrom and defining said recesses through which said electric wire is threaded.

4. The unitized assembly as claimed in claim 3, wherein said shouldered surface is a circular surface, and said ears are spaced around said circular surface in three equally spaced locations therearound, and said electric wire being curled on said ears at each of said three locations for at least substantially straight extents of said electric wire along said shouldered surface to be in a permanent position on said body.

5. The unitized assembly as claimed in claim 1, wherein said electric wire extends from its two ends, and the electric connections thereof, directly into physical contact with said body throughout the remainder of said electric wire, and with said electric wire being of a length approximately twice the length of said shouldered surface, for a substantial length of contact with said body.

6. The unitized assembly as claimed in claim 1, including a block of electric insulation material on which said electric connector pins are supported, and a mounting member connected between said block and said body for support of said block in a fixed position on said body.

7. The unitized assembly as claimed in claim 6, wherein said electric connector pins are embedded in said block and extend therethrough and have the opposite ends of said pins extending from said block for one end of each of said pins on one side of said block to be electrically connected with a respective one of said element two ends, and said mounting member extending from said block one side to said body.

8. The unitized assembly as claimed in claim 7, wherein said mounting member is a bar having one end embedded in said block and being affixed to said body at the other end of said bar for fixedly spacing said block from said body.

9. An electric heater assembly for a coffee percolator, comprising a body member of a thermally conductive material, an electric heater element embedded in and electrically insulated from said body member and having two ends extending therefrom, an electric wire electrically insulated from and supported on said body member for generating heat, a block of an electric insulation material formable by molding, two electrically conductive pins permanently molded in said block to be embedded in said block and with said pins extending through said block and extending therefrom in respective ends of each of said pins to form a permanent and rigid assembly with said block to have the opposite ends of each of said pins respectively electrically connected to an electric power source and to said heater element, said pins and said wire and said heater element two ends all being respectively electrically connected together for conducting electricity through said heater element and said wire from said power source, and a bar permanently molded in said block to embedded in said block at one end of said bar and with the other end of said bar being affixed to said body in a manner suitably providing a permanently assembled body and block in spaced-apart relation.

* * * * *